United States Patent
Kamada

(10) Patent No.: US 9,140,356 B2
(45) Date of Patent: Sep. 22, 2015

(54) TRAVEL CONTROL UNIT OF WORKING VEHICLE

(71) Applicant: Kanzaki Kokyukoki Mfg. Co., Ltd., Amagasaki, Hyogo (JP)

(72) Inventor: Minoru Kamada, Hyogo (JP)

(73) Assignee: KANZAKI KOKYUKOKI MFG. CO., LTD. (JP)

( * ) Notice: Subject to any disclaimer, the term of this patent is extended or adjusted under 35 U.S.C. 154(b) by 0 days.

(21) Appl. No.: 13/927,930

(22) Filed: Jun. 26, 2013

(65) Prior Publication Data

US 2014/0012472 A1    Jan. 9, 2014

(30) Foreign Application Priority Data

Jul. 4, 2012   (JP) ................. 2012-150321
Jul. 4, 2012   (JP) ................. 2012-150373

(51) Int. Cl.
*F16H 61/42* (2010.01)
*G06F 17/00* (2006.01)
*F16H 61/421* (2010.01)
*F16H 61/431* (2010.01)

(52) U.S. Cl.
CPC .............. *F16H 61/42* (2013.01); *F16H 61/421* (2013.01); *F16H 61/431* (2013.01)

(58) Field of Classification Search
None
See application file for complete search history.

(56) References Cited

U.S. PATENT DOCUMENTS

| | | | |
|---|---|---|---|
| 3,126,707 A | 3/1964 | Hann et al. | |
| 4,185,521 A * | 1/1980 | Beals | 477/69 |
| 5,177,964 A * | 1/1993 | Tanaka et al. | 60/445 |
| 5,390,759 A | 2/1995 | Gollner | |
| 5,473,895 A | 12/1995 | Bausenhart et al. | |
| 5,495,912 A * | 3/1996 | Gray et al. | 180/165 |
| 5,787,374 A * | 7/1998 | Ferguson et al. | 701/41 |
| 6,202,783 B1 * | 3/2001 | Taylor et al. | 180/305 |
| 8,316,983 B2 * | 11/2012 | Shirao | 180/305 |
| 2004/0136821 A1 * | 7/2004 | Berger et al. | 414/699 |
| 2006/0014608 A1 * | 1/2006 | Mitchell et al. | 477/107 |
| 2006/0150809 A1 * | 7/2006 | Shah | 91/472 |
| 2006/0155448 A1 * | 7/2006 | Shah | 701/50 |
| 2008/0041049 A1 | 2/2008 | Sakamoto | |
| 2008/0315559 A1 * | 12/2008 | Murakami et al. | 280/446.1 |
| 2010/0009806 A1 * | 1/2010 | Shirao et al. | 477/52 |
| 2010/0174456 A1 * | 7/2010 | Beaudoin et al. | 701/51 |
| 2010/0332061 A1 * | 12/2010 | Forslow et al. | 701/22 |

FOREIGN PATENT DOCUMENTS

JP    2001-71769 A    3/2001
JP    2006-64011 A    3/2006

OTHER PUBLICATIONS

Partial European Search Report corresponding to Application No. 13174772.7-1752/2682648; Date of Mailing: Aug. 7, 2015.

* cited by examiner

*Primary Examiner* — Rami Khatib
*Assistant Examiner* — Navid Ziaeianmehdizadeh
(74) *Attorney, Agent, or Firm* — Cantor Colburn LLP

(57) ABSTRACT

A travel control unit of a working vehicle includes an HST which is a hydraulic continuously variable transmission having a hydraulic pump and a hydraulic motor, a pedal sensor which is an operator sensor which detects a position of an acceleration pedal which is an acceleration operator, and a controller which changes a displacement of the hydraulic pump based on the position of the acceleration pedal. The controller increases the displacement of the hydraulic motor as the displacement of the hydraulic pump is reduced due to a displacement of the acceleration pedal to a low-velocity side.

7 Claims, 11 Drawing Sheets

(HIGH-VELOCITY TRAVEL → STOP)

| | COMPARATIVE EXAMPLE | PRESENT INVENTION |
|---|---|---|
| HYDRAULIC PUMP | SWASH PLATE POSITION 1→0 | SWASH PLATE POSITION 1→0 |
| HYDRAULIC MOTOR | DISPLACEMENT RATIO 1/2 | DISPLACEMENT RATIO 1/2→1 |

FIG. 7

(STARTING TO TRAVEL)

| | WORK TRAVEL | NORMAL TRAVEL (LESS THAN PREDETERMINED INCLINATION) | NORMAL TRAVEL (GREATER THAN OR EQUAL TO PREDETERMINED INCLINATION) |
|---|---|---|---|
| HYDRAULIC PUMP | DISPLACEMENT<br>MINIMUM → MAXIMUM | DISPLACEMENT<br>MINIMUM → MAXIMUM | DISPLACEMENT<br>MINIMUM → MAXIMUM |
| HYDRAULIC MOTOR | DISPLACEMENT<br>FIXED AT MAXIMUM | DISPLACEMENT<br>MAXIMUM → MINIMUM | DISPLACEMENT<br>FIXED AT MAXIMUM OR MAXIMUM → INTERMEDIATE |

FIG. 10

(STARTING TO TRAVEL)

| | WORK TRAVEL | NORMAL TRAVEL (LESS THAN PREDETERMINED INCLINATION) | NORMAL TRAVEL (GREATER THAN OR EQUAL TO PREDETERMINED INCLINATION) |
|---|---|---|---|
| HYDRAULIC PUMP | DISPLACEMENT<br>MINIMUM → MAXIMUM | DISPLACEMENT<br>MINIMUM → MAXIMUM | DISPLACEMENT<br>MINIMUM → MAXIMUM |
| HYDRAULIC MOTOR | DISPLACEMENT<br>FIXED AT MAXIMUM | DISPLACEMENT<br>FIXED AT MINIMUM | DISPLACEMENT<br>FIXED AT MAXIMUM OR INCLINATION ANGLE-CORRESPONDING CAPACITY (OR → INTERMEDIATE) |

FIG. 11

TRAVEL CONTROL UNIT OF WORKING VEHICLE

PRIORITY INFORMATION

This application claims priority to Japanese Patent Application Nos. 2012-150321 and 2012-150373 filed on Jul. 4, 2012, which are incorporated herein by reference in their entirety.

BACKGROUND

1. Technical Field

The present invention relates to a travel control unit of a working vehicle having a hydraulic continuously variable transmission including a hydraulic pump which is driven by an engine and a hydraulic motor which is fluidly connected to the hydraulic pump, and a controller.

2. Related Art

In the related art, a structure is known in which an engine and a hydraulic static continuously variable transmission (HST) are equipped in a working vehicle such as a farm tractor, a lawnmower, a wheel loader, or the like, wherein the hydraulic static continuously variable transmission includes a hydraulic pump and a hydraulic motor fluidly connected to the hydraulic pump. In this structure, the hydraulic pump is driven by an engine, and motive power of a rotational shaft of the hydraulic motor is speed-varied by a gear apparatus or the like and transmitted to a wheel of the vehicle. In addition, the hydraulic pump is of a variable displacement swash plate type in which an angle of the swash plate is changed to increase an amount of discharge of the hydraulic pump, to enable increase of a rotational velocity of the rotational shaft of a fixed displacement hydraulic motor.

JP 2001-71769 A discloses a hydraulic continuously variable transmission integrally constructed by a hydraulic pump and a hydraulic motor, wherein the capacities of the hydraulic pump and the hydraulic motor can be continuously adjusted. With a servo mechanism provided on a side of each of the hydraulic pump and the hydraulic motor, the swash plate angle of the movable swash plate of each of the hydraulic pump and the hydraulic motor is set to be rotatable. A rotation of a speed-varied operation arm of the servo mechanism is realized by manually operating through a link mechanism, an operation lever, or the like, or using a hydraulic piston.

JP 2006-64011 A discloses a hydraulic continuously variable transmission including a hydraulic pump and a hydraulic motor, wherein a variable displacement, movable swashplate type structure is employed for one or both of the hydraulic pump and the hydraulic motor. In this apparatus, a load control mechanism is provided which forms a hydraulic servo mechanism which controls the swash plate angle of the movable swash plate, which has an actuator for moving a pin for inclining the movable swash plate to a side of deceleration, and which guides pressure fluid of the main fluid path of a closed circuit which connects the hydraulic pump and the hydraulic motor to the actuator. The hydraulic motor is maintained at a maximum swash plate angle when stopped, and as the vehicle travels, the swash plate angle is reduced. In addition, a control is applied to reduce the swash plate angle by the load control mechanism.

During acceleration of a working vehicle equipped with the above-described hydraulic continuously variable transmission, when an acceleration pedal which is an acceleration operator is operated, the inclination angle of the movable swash plate of the hydraulic pump is increased with the operation of the acceleration pedal, and the rotational velocity of the hydraulic motor is increased. Because of this, the rotational velocity of the wheel linked to the rotational shaft of the hydraulic motor via a gear mechanism or the like in a manner to allow transmission of the motive power is increased, and the vehicle is accelerated. On the other hand, during the deceleration of the vehicle, when the acceleration pedal is not being operated, that is, the amount of depression of the accelerator pedal becomes 0 and the acceleration pedal is displaced to the side of low velocity, because the displacement of the hydraulic motor is fixed, the supply of the hydraulic oil from the hydraulic pump to the hydraulic motor is rapidly suspended, and the supply of the hydraulic oil from the hydraulic motor to the hydraulic pump is also rapidly suspended. Because of this, there will be no place for the hydraulic oil of the hydraulic motor to move to, causing a rapid deceleration of the hydraulic motor, and consequently, a rapid deceleration of the working vehicle. Therefore, it is desired to make the change of the velocity during deceleration of the working vehicle gradual, to reduce the change in the behavior of the vehicle, and to lessen a feeling of shock experienced by the driver during deceleration. In the vehicles having the hydraulic continuously variable transmission disclosed in JP 2001-71769 A and JP 2006-64011 A, there is still room for improvement from the viewpoint of lessening rapid deceleration of the vehicle when the acceleration operator is displaced on the side of low velocity.

When the rotational velocity of the wheel linked to the rotational shaft of the hydraulic motor through a gear mechanism or the like in a manner to allow transmission of motive power is increased as described above and the vehicle is accelerated, some users may wish to prevent the feeling of shock due to rapid acceleration regardless of the operation of the acceleration pedal when the vehicle starts to travel. In addition, the user may wish to change the travel starting performance between a work state where a working implement is used and a normal travel state where the working implement is not used. For example, when the working vehicle is a farm tractor, if the vehicle rapidly starts to travel while the working implement such as a tiller is working on the ground, an unfavorable state of the ground, such as a rough field, may result, and the user may wish to prevent such an unfavorable state. JP 2001-71769 A and JP 2006-64011 A do not disclose a means to facilitate provision of a travel starting performance according to the user's desires. For example, although JP 2006-64011 A discloses that the hydraulic motor of the HST is maintained at the maximum swash plate angle when stopped and the swash plate angle is reduced as the vehicle travels, the document does not disclose under what conditions such an operation is employed.

SUMMARY

An advantage of at least one travel control unit of a working vehicle according to the present invention is that rapid deceleration of a vehicle when an acceleration operator is displaced on a low velocity side is reduced.

An advantage of at least one travel control unit of a working vehicle according to the present invention is that provision of a travel starting performance of the working vehicle in accordance with the user's desires is facilitated.

According to a first aspect of the present invention, there is provided a travel control unit of a working vehicle, comprising a hydraulic continuously variable transmission which is interposed between an engine and a wheel, which includes a hydraulic pump driven by the engine and a hydraulic motor fluidly connected to the hydraulic pump, and wherein the hydraulic pump and the hydraulic motor are respectively of a continuous displacement variable type in which a displacement continuously varies, an operator sensor which detects a position of an acceleration operator, and a controller which changes a displacement of the hydraulic pump based on the position of the acceleration operator, wherein the controller increases the displacement of the hydraulic motor as the displacement of the hydraulic pump is reduced due to a displacement of the acceleration operator to a low-velocity side.

According to a second aspect of the present invention, there is provided a travel control unit of a working vehicle, comprising a hydraulic continuously variable transmission which is interposed between an engine and a wheel, which includes a hydraulic pump driven by the engine and a hydraulic motor fluidly connected to the hydraulic pump, and wherein the hydraulic pump and the hydraulic motor are respectively of a continuous displacement variable type in which a displacement continuously varies, an operator sensor which detects a position of an acceleration operator, and a controller which changes the displacement of the hydraulic pump based on the position of the acceleration operator, wherein the controller always sets the displacement of the hydraulic motor at an initial stage of start of travel to a maximum displacement in a variable displacement range.

According to a third aspect of the present invention, there is provided a travel control unit of a working vehicle, comprising a hydraulic continuously variable transmission which is interposed between an engine and a wheel, which includes a hydraulic pump driven by the engine and a hydraulic motor fluidly connected to the hydraulic pump, and wherein the hydraulic pump and the hydraulic motor are respectively of a continuous displacement variable type in which a displacement continuously varies, an operator sensor which detects a position of an acceleration operator, and a controller which changes the displacement of the hydraulic pump based on the position of the acceleration operator, wherein the controller sets the displacement of the hydraulic motor at an initial stage of start of travel to a maximum displacement in a variable displacement range when the controller judges that a working implement is being driven, and sets the displacement of the hydraulic motor at the initial stage of starting to travel to a minimum displacement in the variable displacement range when the controller judges that the working implement is not being driven and a special condition which is set in advance is satisfied.

BRIEF DESCRIPTION OF THE DRAWINGS

FIG. 7 is a diagram showing, in relation to a comparative example, the swash plate position of the hydraulic pump and the displacement ratio of the hydraulic motor when the apparatus transitions from high velocity traveling to the stopping control in the first preferred embodiment of the present invention.

FIG. 10 is a diagram showing capacities of a hydraulic pump and a hydraulic motor during travel starting in the second preferred embodiment of the present invention, in a comparison of a time of work travel and a time of normal travel.

FIG. 11 is a diagram showing capacities of a hydraulic pump and a hydraulic motor during start of travel in a third preferred embodiment of the present invention, in a comparison of a time of work travel and a time of normal travel.

DESCRIPTION OF EXEMPLARY EMBODIMENTS

[First Preferred Embodiment]

Figure 1:
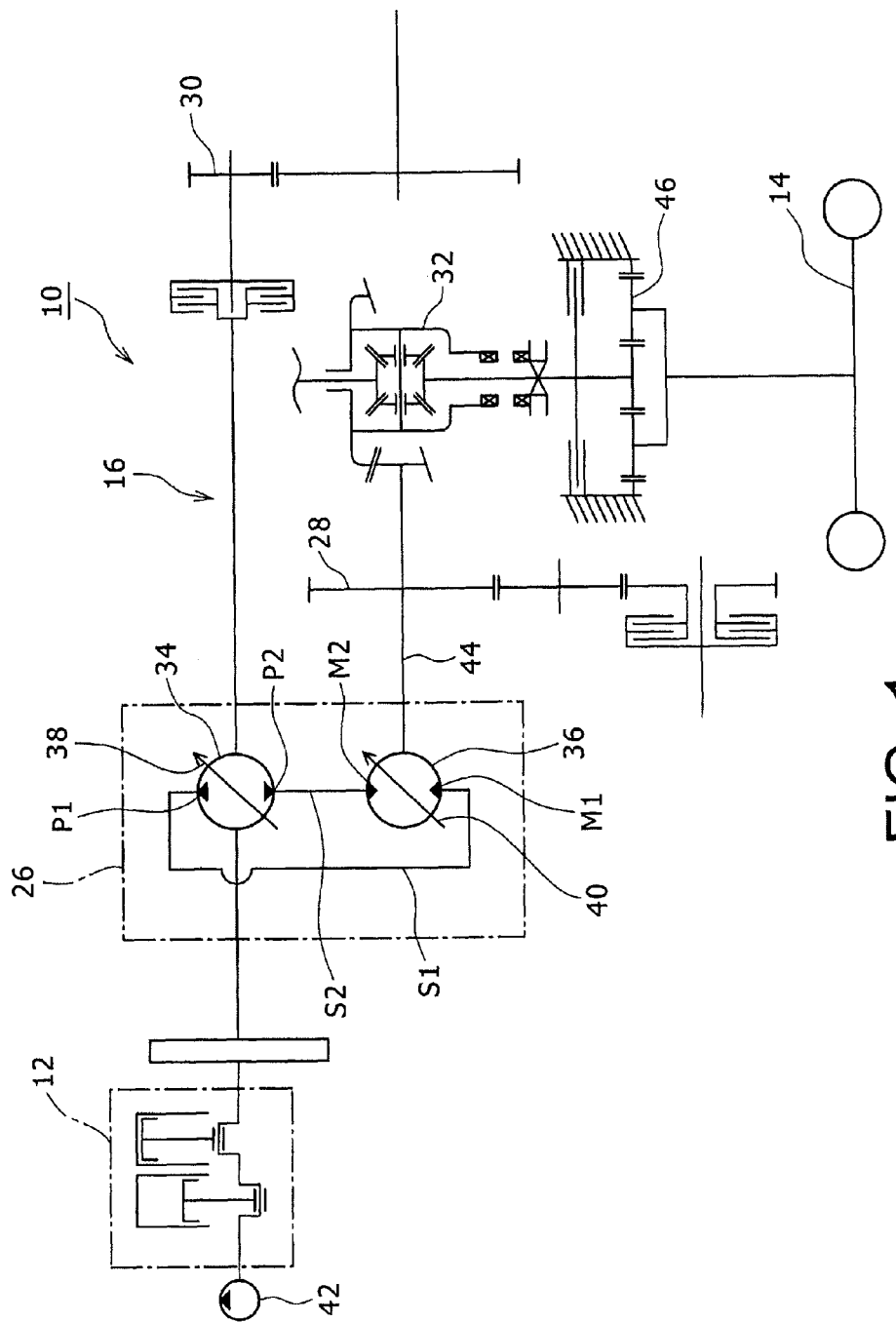
FIG. 1 is a schematic diagram showing an overall structure of a working vehicle equipped with a travel control unit according to a first preferred embodiment or a second preferred embodiment of the present invention.

Preferred embodiments of the present invention will now be described in detail with reference to the drawings. FIGS. 1-8 are diagrams showing a first preferred embodiment of the present invention. FIG. 1 is a schematic diagram showing an overall structure of a working vehicle in which a travel control unit of a working vehicle according to the present embodiment is equipped. The working vehicle in which the travel control unit of the present embodiment is equipped may be, for example, a farm tractor for farm work, a lawnmower for mowing work, a wheel loader for public work, or the like.

As shown in FIG. 1, a working vehicle 10 comprises a vehicle frame (not shown), components supported on the vehicle frame including an engine 12, front wheels (not shown) which are a left wheel and a right wheel, and rear wheels 14 which are a left wheel and a right wheel (in FIG. 1, only one of the two wheels is shown), and a working implement (not shown) such as a tiller, a lawnmower, or the like. A motive power transmitting apparatus 16 which is a motive power transmitting unit is supported on the vehicle frame, and after rotational power of the engine 12 is converted into hydraulic power, the power is again converted to rotational power and transmitted to the front wheels and the rear wheels 14. On a front side of a driver seat (not shown) provided on the working vehicle 10, an acceleration pedal 18 (FIG. 2), which is an acceleration operator, and a brake pedal 20 (FIG. 2) which is a brake operator, are provided.

Figure 2:
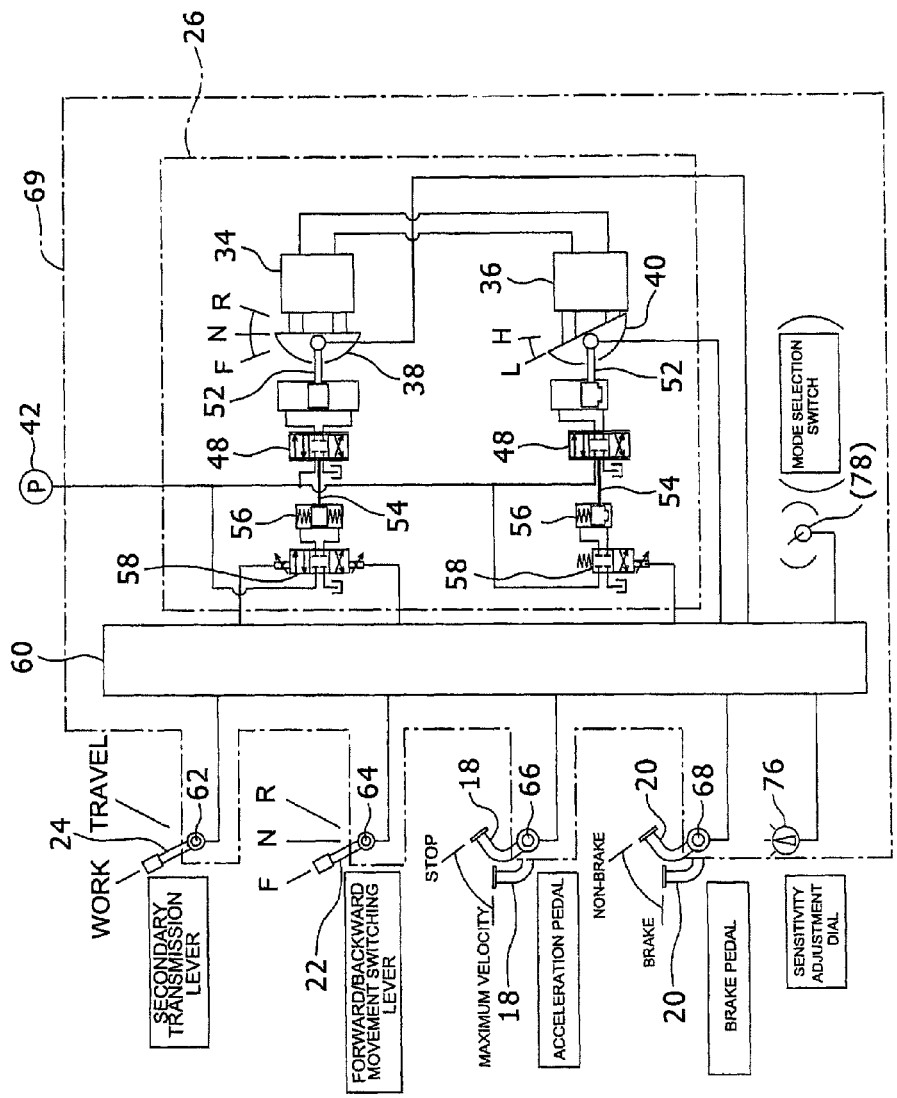
FIG. 2 is a diagram showing a hydraulic control circuit and a controller of a hydraulic continuously variable transmission controlled by the travel control unit according to the first preferred embodiment of the present invention.

FIG. 2 is a diagram showing a hydraulic control circuit and a controller of a hydraulic continuously variable transmission controlled by the travel control unit of the present embodiment. In FIG. 2, two pedals 18 and two pedals 20 are shown, but this illustration is merely for showing different positions, and in reality, only one pedal 18 and one pedal 20 are provided. When the acceleration pedal 18 is depressed, acceleration is instructed, and when the brake pedal 20 is depressed, braking is instructed. Alternatively, the brake pedal 20 may be mechanically or electrically connected to a brake apparatus provided at a peripheral section of the wheel, and the wheel may be braked using the brake apparatus in accordance with the braking of the brake pedal 20.

In each of the pedals 18 and 20, when there is no depression, the pedal is set in a non-operation state. In addition, a forward/backward movement switching lever 22 and a secondary transmission lever 24 are also provided at a peripheral section of the driver's seat, in a manner to be able to be reciprocated in the front-and-rear direction of the vehicle. When the forward/backward movement switching lever 22 is tilted to the front, a forward movement is instructed, when the lever 22 is tilted to the rear, a backward movement is instructed, and when the lever 22 is in an upright state, a neutral state is instructed. When the secondary transmission lever 24 is tilted to the front, a work mode in which the working implement is lowered to a working position and driven is instructed, and when the lever 24 is tilted to the rear, a non-working, normal travel mode in which the working implement is lifted and the driving is stopped is instructed. During high-velocity travel, the secondary transmission lever 24 is used to instruct the normal travel mode, and the vehicle travels in a state where the working implement is lifted.

Referring again to FIG. 1, the motive power transmitting apparatus 16 comprises a hydraulic static continuously variable transmission 26 (hereinafter referred to as "HST") interposed between the engine 12 and the front wheels and rear wheels 14, gear mechanisms 28 and 30, and a differential mechanism 32. The HST 26 comprises a hydraulic pump 34 and a hydraulic motor 36 which are provided in a casing and which are fluidly connected to each other. A rotational shaft of the hydraulic pump 34 is linked to the rotational shaft of the engine 12, and is driven by the engine 12. The hydraulic pump 34 and the hydraulic motor 36 comprise movable swashplates 38 and 40, respectively, and are of a continuous variable displacement type in which the displacement varies continuously. Specifically, the hydraulic pump 34 and the hydraulic motor 36 form a closed circuit, a first port P1 of the hydraulic pump 34 and a first port M1 of the hydraulic motor 36 are connected by a first fluid path S1, and a second port P2 of the hydraulic pump 34 and a second port M2 of the hydraulic motor 36 are connected by a second fluid path S2. The HST 26 performs a hydraulic static transmitting process using the hydraulic pump 34 and the hydraulic motor 36. In the hydraulic motor 36 and the hydraulic pump 34, the respective capacities can be continuously changed by changing inclination angles of the movable swash plates 38 and 40.

An auxiliary pump 42 is linked to the engine 12 in a manner to enable transmission of motive power. When the rotational shaft of the hydraulic pump 34 is driven, a pressurized hydraulic oil is discharged from one of the ports among the first port P1 and the second port P2, and the hydraulic oil is taken in from the other port. In the movable swash plate 38 of the hydraulic pump 34, an orientation and an angle of the movable swash plate 38 can be changed by movement of an operation pin 52 (FIG. 2) which is a swash plate operation shaft. Based on the orientation and angle of the movable swash plate 38, the side of discharge and the side of intake of the hydraulic pump 34 are determined, and a discharge displacement is determined.

A motive power of a motor shaft 44 of the hydraulic motor 36 can be transmitted through the gear mechanism 28 and a clutch to an axle which drives two front wheels. In addition, the motive power of the motor shaft 44 of the hydraulic motor 36 can be transmitted via the differential mechanism 32 and a planetary gear mechanism 46 to left and right rear wheels 14. In other words, the motor shaft 44 is operatively linked via the motive power transmitting apparatus 16 to the two front wheels and the two rear wheels 14. In addition, the motive power of the drive shaft of the engine 12 can be transmitted via another clutch and another gear mechanism 30 to the rotational shaft of the working implement.

As shown in FIG. 2, in the casing of the HST 26, two hydraulic servo mechanisms 48 are provided respectively corresponding to each of the hydraulic pump 34 and the hydraulic motor 36. Each servo mechanism 48 comprises a servo piston provided inside a cylinder in a slidable manner and a spool provided in the servo piston in a slidable manner. The operation pin 52 for driving the movable swash plate is engaged with the servo piston, and an arm member 54 is engaged with a sleeve. The arm member 54 is maintained at a neutral position by an urging force of a spring which constitutes a neutral position maintaining mechanism 56. Two neutral position maintaining mechanisms 56 are provided respectively corresponding to each of the hydraulic pump 34 and the hydraulic motor 36. A pressurized hydraulic oil is introduced from the auxiliary pump 42 to one of pressure chambers, on both sides of the arm member 54, selected by a solenoid-type directional control valve 58. Because of this, the arm member 54 is driven in one of the directions, and the spool of the servo mechanism 48 is moved. With the movement of the spool, the connection state of the fluid path in the servo piston and the fluid path in the sleeve is switched, and among the pressurized chambers on both sides of the servo piston, the hydraulic oil introduction side from the auxiliary pump 42 and the hydraulic oil discharge side to a fluid reservoir are switched. Consequently, the movable swash plate 38 or 40 of the hydraulic pump 34 or the hydraulic motor 36 is inclined in one of the directions. The direction and amount of inclination of the movable swash plate 38 or 40 are determined according to a control signal which is input from a controller 60 to the directional control valves 58.

The controller 60 comprises a microcomputer having a CPU and a storage unit such as a memory. Detection signals are input to the controller 60 from a plurality of operator sensors. Specifically, a position of the secondary transmission lever 24 is detected by a lever sensor 62 which is an operator sensor. A position of the forward/backward movement switching lever 22 is detected by a second lever sensor 64 which is an operator sensor. A position of the acceleration pedal 18 is detected by a pedal sensor 66 which is an operator sensor. When the acceleration pedal 18 is depressed, the pedal sensor 66 provided at a peripheral section of the acceleration pedal 18 detects an amount of depression, that is, an amount of operation, of the acceleration pedal 18.

An operation position of the brake pedal 20 is detected by a second pedal sensor 68 which is a brake pedal sensor and also an operator sensor. The detection signals of the sensors 62, 64, 66, and 68 are input to the controller 60. A travel control unit 69 of the present embodiment comprises the HST 26, the controller 60, and the sensors 62, 64, 66, and 68 described above.

Figure 3:
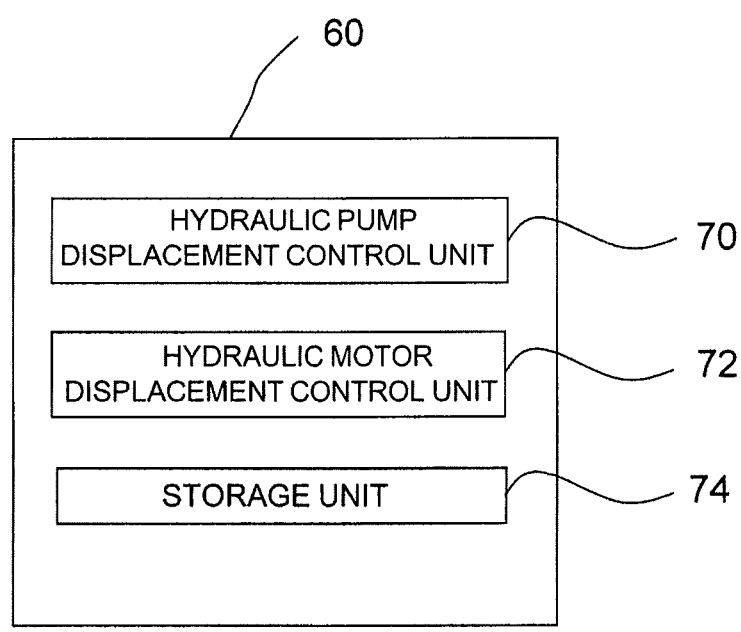
FIG. 3 is a block diagram showing a structure of a travel control unit of FIG. 2.

As shown in FIG. 3, the controller 60 comprises a hydraulic pump displacement control unit 70, a hydraulic motor displacement control unit 72, and a storage unit 74. The hydraulic pump displacement control unit 70 changes a displacement of the hydraulic pump 34 based on the position of the acceleration pedal 18 detected by the pedal sensor 66. The hydraulic pump displacement control unit 70 causes the movable swash plate of the hydraulic pump 34 of FIG. 2 to incline from N to F, that is, in a direction to increase the inclination angle on the forward movement side, when the position of the forward/backward movement switching lever 22 (FIG. 2) is on the forward movement side (F side). The hydraulic pump displacement control unit 70 outputs a control signal to the directional control valve 58. With this output, the displacement of the hydraulic pump 34 is increased as the position of the acceleration pedal 18 approaches a maximum depression position shown in FIG. 2 with a label "maximumvelocity", and the displacement of the hydraulic pump 34 is reduced as the position of the acceleration pedal 18 approaches a non-operation position shown in FIG. 2 with a label "stop". With the movement of the arm member 54 by the directional control valve 58, the inclination angle of the movable swash plate 38 is determined by means of the servo mechanism 48 and the operation pin 52. If the displacement of the hydraulic motor 36 is a constant, as the displacement of the hydraulic pump 34 is increased, the rotational velocity of the motor shaft 44 (FIG. 1) of the hydraulic motor 36 is increased, and the rotational velocities of the front wheels and the rear wheels 14 are also increased. In the present embodiment, a four-wheel drive configuration is employed in which the motive power of the hydraulic motor 36 is transmitted to the front wheels and the rear wheels 14, but alternatively, a two-wheel drive configuration may be employed in which the motive power of the hydraulic motor 36 is transmitted only to the front wheels or to the rear wheels 14.

In FIG. 2, when the position of the forward/backward movement switching lever 22 is on the backward movement side (R side), the hydraulic pump displacement control unit 70 causes the movable swash plate of the hydraulic pump 34 to incline from N to R, that is, in a direction to increase the inclination angle on the backward movement side. In addition, a steering operator (not shown) such as a steering wheel is provided in the working vehicle 10 (FIG. 1), so that the front wheels which are mechanically or electrically linked can be steered according to an operation position of the steering operator.

The hydraulic motor displacement control unit 72 (FIG. 3) changes the displacement of the hydraulic motor 36 based on the position of the acceleration pedal 18 detected by the pedal sensor 66 (FIG. 2). In this case, the inclination angle of the movable swash plate 40 of the hydraulic motor 36, that is, an inclination angle with respect to a plane perpendicular to a shaft direction of the motor shaft 44 (FIG. 1), can be continuously changed between an L position and an H position in FIG. 2. When the inclination angle of the movable swash plate 40 of the hydraulic motor 36 is at the maximum and at the L position, the hydraulic motor 36 has a maximum displacement. That is, the amount of hydraulic oil compressed by the piston in the cylinder of the hydraulic motor 36 with one rotation of the motor shaft 44 and discharged is at the maximum. On the other hand, when the inclination angle of the movable swash plate 40 of the hydraulic motor 36 is at the minimum and at the H position, the hydraulic motor 36 has a minimum displacement. That is, the amount of hydraulic oil compressed by the piston in the cylinder of the hydraulic motor 36 by one rotation of the motor shaft 44 and discharged is at the minimum. As described, the hydraulic motor 36 has a structure in which the displacement can be continuously changed between the minimum displacement and the maximum displacement.

The hydraulic motor displacement control unit 72 can change the position of the movable swash plate 40 of the hydraulic motor 36 from the L position toward the H position of FIG. 2 so that an amount of increase of the vehicle velocity is increased as the acceleration pedal 18 is operated and the position of the acceleration pedal 18 is moved from the "stop" position in FIG. 2, that is, the non-operation position, toward the "maximum velocity" position in FIG. 2. Alternatively, the hydraulic motor displacement control unit 72 can increase the displacement of the hydraulic pump 34 and increase the vehicle velocity while the movable swash plate 40 of the hydraulic motor 36 is kept at the L position of FIG. 2 during a first half of the depressing of the acceleration pedal 18 as the position of the acceleration pedal 18 moves from the "stop" position of FIG. 2 toward the "maximum velocity" position of FIG. 2. Then, after the movable swash plate 38 of the hydraulic pump 34 reaches the F position and the maximum displacement is reached, the hydraulic motor displacement control unit 72 can change the position of the movable swash plate of the hydraulic motor 36 from the L position of FIG. 2 toward the H position and increase the vehicle velocity as the position of the acceleration pedal 18 moves toward the "maximum velocity" position of FIG. 2.

When the acceleration pedal 18 is set to the non-operation state, the acceleration pedal 18 is automatically returned to the stop position by a force of a spring provided at a peripheral section of the acceleration pedal 18 or of a member linked to the acceleration pedal 18. In addition, when the acceleration pedal 18 is set to the non-operation state during the high-velocity traveling and the position of the acceleration pedal 18 is displaced from the high-velocity side to the low-velocity side, that is, from a depressed position to the stopping position, the hydraulic pump displacement control unit 70 controls the displacement of the hydraulic pump 34 to be reduced. On the other hand, the hydraulic motor displacement control unit 72 controls the displacement of the hydraulic motor 36 to be increased as the displacement of the hydraulic pump 34 is reduced.

For this purpose, the controller 60 stores in advance in the storage unit 74 (FIG. 3) data representing a relationship between the position of the swash plate of the hydraulic pump 34 and the displacement ratio of the hydraulic motor 36 when the vehicle is decelerated by a non-operation of the acceleration pedal 18 during the travel.

Figure 4:
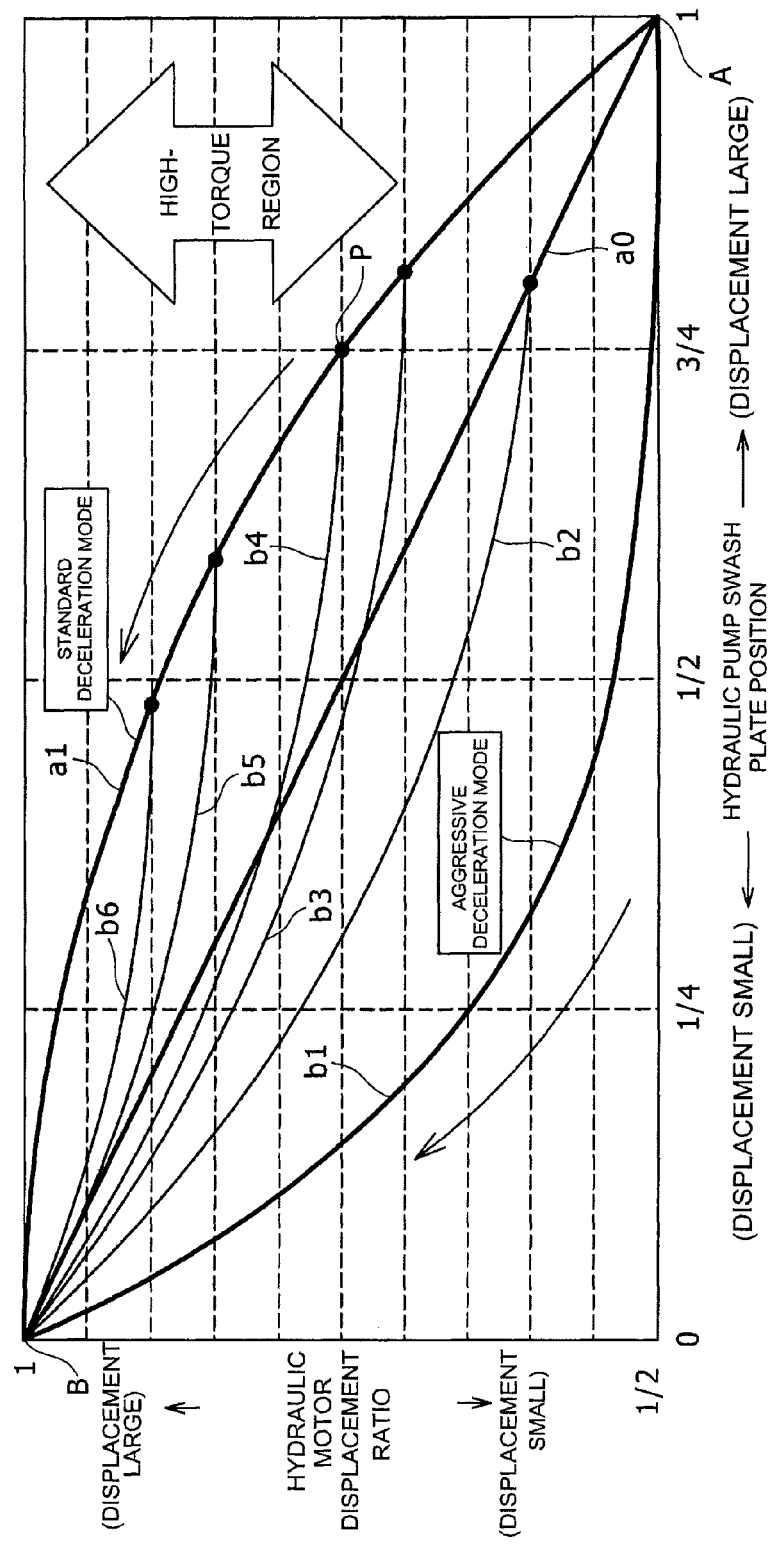
FIG. 4 is a diagram showing, using a plurality of deceleration modes, a relationship between a swash plate position of a hydraulic pump and a displacement ratio of a hydraulic motor used when the vehicle transitions from high velocity traveling to stopping control in the first preferred embodiment of the present invention.

FIG. 4 is a diagram showing, using a plurality of deceleration modes, a relationship between the position of the swash plate of the hydraulic pump and the displacement ratio of the hydraulic motor used for transition from the high-velocity travel to the stopping control in the present embodiment. In the following description, the same elements as those shown in FIGS. 1-3 are described with the same reference numerals. For example, data representing a "standard deceleration mode" is stored in the storage unit 74. In this case, the hydraulic motor displacement control unit 72 changes the displacement of the hydraulic motor 36 according to a relationship between the swash plate position of the hydraulic pump 34 and the displacement ratio of the hydraulic motor 36 defined in the standard deceleration mode stored in the storage unit 74 when it is judged that the acceleration pedal 18 is set to the non-operation state during travel of the vehicle.

A horizontal axis of FIG. 4 represents a swash plate position of the hydraulic pump 34. A swash plate position 1 shows that the hydraulic pump 34 has the maximum displacement, the displacement is gradually reduced in the order of positions 3/4, 1/2, and 1/4, and the swash plate position 0 shows a stand-by position. The stand-by position corresponds to a state where the movable swash plate 38 is positioned on a plane perpendicular to the rotational shaft of the hydraulic pump 34. In other words, the horizontal axis of FIG. 4 can be replaced by the displacement of the hydraulic pump 34.

A vertical axis of FIG. 4 represents a displacement ratio of the hydraulic motor 36, that is, a proportion of the displacement with respect to the maximum displacement when the case in which the hydraulic motor 36 has the maximum displacement is set as 1. Therefore, the displacement ratio being 1/2 means that the hydraulic motor 36 has a minimum displacement having a displacement of 1/2 the maximum displacement. In FIG. 4, a straight line connecting a point A where the swash plate position of the hydraulic pump 34 is 1 and the displacement ratio of the hydraulic motor 36 is 1/2 and a point B where the swash plate position of the hydraulic pump 34 is 0 and the displacement ratio of the hydraulic motor 36 is 1 is assumed to be a reference line a0. The point A corresponds to a state where the vehicle is traveling at the maximum velocity, and the point B corresponds to the stopped state of the vehicle. The "standard deceleration mode" is represented by a curve connecting the point A and the point B and is drawn on an upper side of the reference line a0. Because of this, as the displacement of the hydraulic pump 34 is reduced from the state of the point A, the degree of increase of the displacement of the hydraulic motor 36 during an initial stage of deceleration is increased and the degree of increase of the displacement of the hydraulic motor 36 in a stage immediately before stopping is reduced.

Data representing a plurality of "aggressive deceleration modes" (aggressive modes) shown in FIG. 4 are also stored in advance in the storage unit 74. In the "aggressive deceleration mode", the "standard deceleration mode" is set as normal time, and the degree of the deceleration when the acceleration pedal 18 is set to the non-operation state during traveling of the vehicle is rapidly increased in the initial stage of the deceleration compared to the "standard deceleration mode". The hydraulic motor displacement control unit 72 can determine whether to set the standard deceleration mode or to set the aggressive deceleration mode based on a difference between the operation and the non-operation of the brake pedal. For example, if the brake pedal is non-operated, the displacement of the hydraulic motor 36 is determined according to the displacement of the hydraulic pump 34 and based on the "standard deceleration mode". On the other hand, when the position of the brake pedal 20 represented by the detection signal which is input from the second pedal sensor 68 is at the operation position, that is, when the brake pedal 20 is operated, the displacement of the hydraulic motor 36 is determined according to the displacement of the hydraulic pump 34 and based on the "aggressive deceleration mode".

The "aggressive deceleration mode" is drawn by a plurality of line segments b1, b2, . . . b6 connecting any one of the points on the standard deceleration mode a1 and the point B in FIG. 4, and is represented, for example, by a curve b1 drawn to pass the points A and B on a lower side of the reference line a0. The determination of which of the points on the standard deceleration mode and the point B are to be connected is made based on the swash plate position of the hydraulic pump 34 at the time when the operation of the brake pedal 20 is started. For example, when the swash plate position of the hydraulic pump 34 at the time when the driver of the vehicle sets the acceleration pedal 18 to the non-operation state and starts stepping on the brake pedal 20 is at 3/4, the aggressive deceleration mode b4 connecting a point P and the point B is selected, and the displacement of the hydraulic motor 36 is changed according to the displacement of the hydraulic pump 34 and based on the mode of b4. The controller 60 also changes the displacement of the hydraulic motor 36 to the maximum displacement at the same time as the displacement of the hydraulic pump 34 is set to the stand-by displacement when the position of the acceleration pedal 18 represented by the detection signal which is input from the pedal sensor 66 becomes the non-operation state. In addition, when the brake pedal 20 is operated after the non-operation of the acceleration pedal 18, that is, when the aggressive deceleration mode is selected, the degree of increase of the displacement of the hydraulic motor 36 corresponding to the reduction of the displacement of the hydraulic pump 34 is reduced at the initial stage of deceleration compared to the case where the control is based on the standard deceleration mode a1 which is the normal time.

The controller 60 also includes a sensitivity adjustment dial 76 (FIG. 2) which is a deceleration state setting unit. The sensitivity adjustment dial 76 allows a user to set a degree of deceleration when stop control is applied when the acceleration pedal 18 is set to the non-operation state during traveling of the vehicle, and allows setting of modes from the standard deceleration mode to a maximum aggressive deceleration mode in a plurality of stages or continuously by rotating a knob portion. For example, line segments representing the plurality of aggressive deceleration modes connecting a point where a relationship between the swash plate position of the hydraulic pump 34 and the displacement ratio of the hydraulic motor in the modes are equal respectively and the point B in FIG. 4 can be set.

Figure 5:
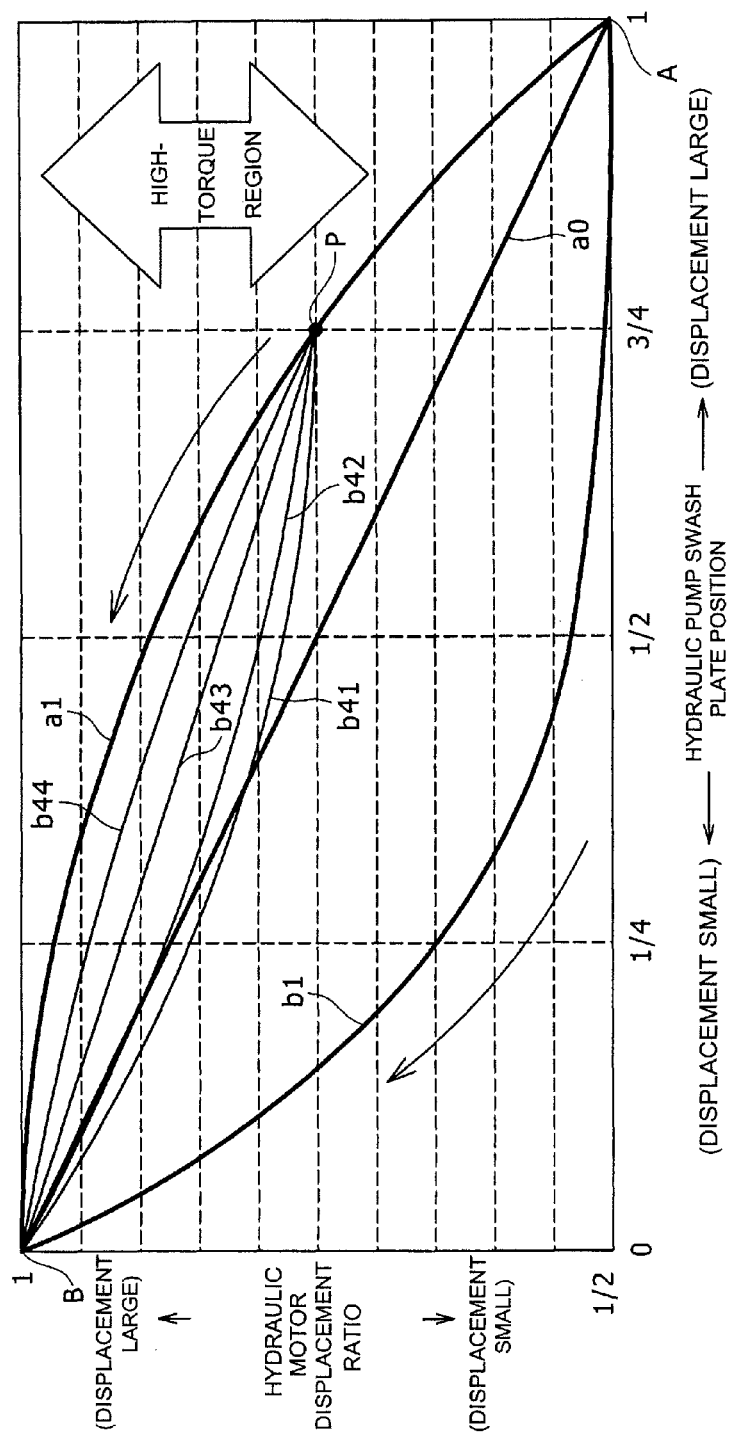
FIG. 5 is a diagram corresponding to FIG. 4 and showing a state where a plurality of aggressive deceleration modes are set, connecting a point where the swash plate position of the hydraulic pump and the displacement ratio of the hydraulic motor in the modes are equal respectively and a point representing a stopped state, in the first preferred embodiment of the present invention.

FIG. 5 is a diagram corresponding to FIG. 4 and shows a state where a plurality of aggressive deceleration modes which connect the point where the swash plate position of the hydraulic pump and the displacement ratio of the hydraulic motor in the modes are equal respectively and the point representing the stopped state are set. In FIG. 5, a plurality of line segments b41, b42, b43, and b44 which connect the point P on the curve a1 representing the standard deceleration mode and the point B are set, and a plurality of aggressive deceleration modes are set corresponding to these line segments. With the sensitivity adjustment dial 76, one of the plurality of aggressive deceleration modes b41, b42, b43, and b44 or the standard deceleration mode a1 can be set by rotating the knob portion. The deceleration intensity at the initial stage of deceleration can be adjusted using the sensitivity adjustment dial 76. A structure may be employed in which, when the aggressive deceleration mode is set using the sensitivity adjustment dial 76, the setting of the aggressive deceleration mode by the operation of the brake pedal 20 is not applied.

When such an aggressive deceleration mode is set, even if the brake pedal 20 is in the non-operation state when the acceleration pedal 18 is set in the non-operation state, the displacement of the hydraulic motor 36 can be changed based on the set aggressive deceleration mode. In FIG. 5, only the line segments representing the plurality of aggressive deceleration modes b41, b42, b43, and b44 which connect the point P where the swash plate position of the hydraulic pump 34 and the displacement ratio of the hydraulic motor 36 are respectively equal and the point B representing the stopped state are shown, but a plurality of aggressive deceleration modes corresponding to the plurality of points on the standard deceleration mode a1 can be set corresponding to the setting of the sensitivity adjustment dial 76. In FIGS. 4 and 5, for a point where a crossing point with a line segment representing the aggressive deceleration mode on the curve a1 representing the standard deceleration mode is not stored in the storage unit 74, the aggressive deceleration mode at this point can be set through interpolation based on the aggressive deceleration modes stored at both sides of the point on the standard deceleration mode a1 or using a preset relationship equation.

Figure 6:
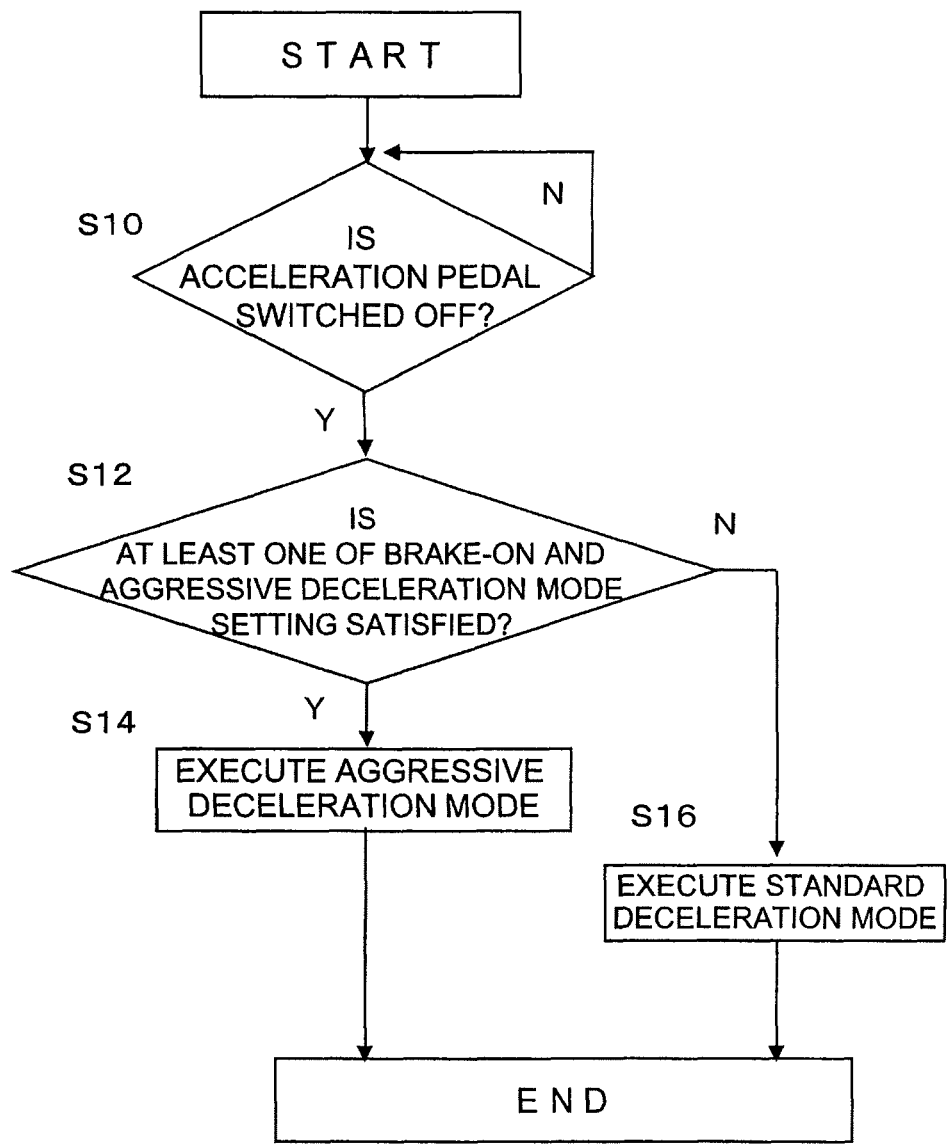
FIG. 6 is a flowchart showing a method of executing a deceleration control using the travel control unit according to the first preferred embodiment of the present invention.

FIG. 6 is a flowchart showing a method of executing the deceleration control using the travel control unit of the present embodiment. In step S10 (hereinafter step S will simply referred to as "S"), when the controller 60 judges that the acceleration pedal 18 is OFF, that is, non-operated, in S12, the controller 60 judges whether or not at least one of conditions that the brake pedal 20 is switched ON, that is, operated, and that the aggressive deceleration mode is set by the sensitivity adjustment dial 76 is satisfied. When the judgment result of S12 is yes, the aggressive deceleration mode is executed in S14. In the aggressive deceleration mode, the displacement of the hydraulic motor 36 is changed corresponding to the displacement of the hydraulic pump based on the relationship representing the aggressive deceleration mode which is set in FIG. 4, FIG. 5, or the like, and the vehicle is decelerated and stopped. On the other hand, if the judgment result of S12 is no, the process proceeds to S16, the displacement of the hydraulic motor 36 is changed corresponding to the displacement of the hydraulic pump 34 based on the standard deceleration mode represented by the curve a1 of FIG. 4, the vehicle is decelerated, and the process returns again to the step of S10. That is, when END of FIG. 6 is reached, the process returns to START and the steps are repeated.

With such a travel control unit of a working vehicle according to the present embodiment, even when the acceleration pedal 18 is displaced to the low-velocity side during the traveling of the vehicle due to non-operation, the displacement of the hydraulic motor 36 is increased with the reduction of the displacement of the hydraulic pump 34. Because of this, rapid deceleration of the hydraulic motor 36 can be reduced, and the rapid deceleration of the vehicle when the acceleration pedal 18 is displaced to the low-velocity side can be reduced. Therefore, the feeling of shock of deceleration experienced by the driver can be reduced. In addition, because continuously variable displacement type structures in which the capacities vary continuously are employed for the hydraulic pump 34 and the hydraulic motor 36, even though the maximum velocity of the vehicle can be set high, the feeling of shock of deceleration due to non-operation of the acceleration pedal 18 can be set close to the case of the vehicle having a low maximum velocity. Because of this, the maneuverability of the vehicle by the driver can be improved.

FIG. 7 is a diagram showing the swash plate position of the hydraulic pump 34 and the displacement ratio of the hydraulic motor 36 during the transition from the high-velocity travel to the stop control, in relation to a comparative example. As shown in the column of the "comparative example" in FIG. 7, in the comparative example, when the acceleration pedal 18 is set to the non-operation state during high-velocity traveling of the vehicle, the swash plate position of the hydraulic pump 34 changes from 1 to 0 to reduce the displacement, but the displacement ratio of the hydraulic motor 36 is maintained at a constant of 1/2. This case is equivalent to moving from right to left on the horizontal axis, on FIG. 4 described above, representing the displacement ratio of the hydraulic motor 36 of 1/2. In this case, because the displacement of the hydraulic motor 36 is maintained low although the displacement of the hydraulic pump 34 is reduced, there is no place for the hydraulic oil discharged from the hydraulic pump 34 and the hydraulic oil discharged from the hydraulic motor 36 in the closed circuit to move to, and the motor shaft 44 of the hydraulic motor 36 is rapidly decelerated. Because of this, the working vehicle 10 is rapidly decelerated when the acceleration pedal 18 is non-operated, and the feeling of shock of deceleration experienced by the driver may be large.

In the case of the present embodiment, as shown in the column of "present invention" in FIG. 7, when the acceleration pedal 18 is set to non-operation state during the high-velocity traveling of the vehicle, the swash plate position of the hydraulic pump 34 changes from 1 to 0 to reduce the displacement, and at the same time, the displacement ratio of the hydraulic motor 36 is increased from 1/2 to 1 to increase the displacement. Because of this, the rapid deceleration of the hydraulic motor 36 can be reduced, deceleration of the vehicle at the time of non-operation of the acceleration pedal 18 can be made gradual, and the feeling of shock of deceleration experienced by the driver can be reduced. The displacement of the hydraulic motor 36 in the non-operation state of the acceleration pedal when the vehicle is not at the maximum velocity is determined from the swash plate position of the hydraulic pump 34 between the point A and the point B on the curve a1 of FIG. 5.

When the acceleration pedal 18 is set to the non-operation state during high-velocity traveling of the vehicle at the maximum velocity, the vehicle is decelerated along the standard deceleration mode shown by the curve a1 from the point A of FIG. 4, and therefore the displacement of the hydraulic motor 36 is gradually increased as the displacement of the hydraulic pump 34 is reduced. In addition, because the curve a1 is set at an upper side of the reference line a0 which connects the point A and the point B by a straight line, the degree of increase of the displacement of the hydraulic motor 36 at the initial stage of deceleration is large, and the degree of increase of the displacement of the hydraulic motor 36 corresponding to the reduction of the displacement of the hydraulic pump 34 is gradually reduced. Because of this, the feeling of shock of deceleration experienced by the driver at the time when the acceleration pedal 18 is set to the non-operation state can be further reduced. The degree of increase of the displacement of the hydraulic motor 36 becomes small in the state where the vehicle velocity is sufficiently reduced, that is, when the displacement of the hydraulic pump 34 is sufficiently reduced, but in such a low-velocity range, the feeling of shock of deceleration experienced by the driver is sufficiently low.

Figure 8:
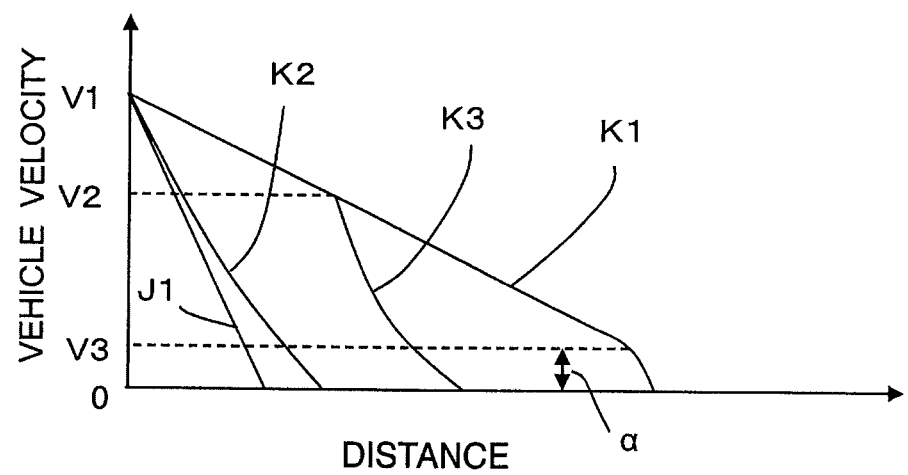
FIG. 8 is a diagram showing a relationship between a distance a vehicle travels and a vehicle velocity from a time when an acceleration pedal is set to a non-operation state in a working vehicle equipped with the travel control unit according to the first preferred embodiment of the present invention.

FIG. 8 is a diagram showing a relationship between a distance moved by the vehicle and the vehicle velocity from the time when the acceleration pedal 18 is set to the non-operation state in a working vehicle equipped with the travel control unit of the present embodiment. K1 in FIG. 8 shows a relationship between the distance and the vehicle velocity when the acceleration pedal 18 is set to the non-operation state from the maximum velocity V1 in the present embodiment, and J1 in FIG. 8 shows the case of the comparative example. In K1 which follows the "standard deceleration mode", the reduction of vehicle velocity is gradual, but in J1 representing the comparative example, the reduction of the vehicle velocity is rapid. As is clear from the comparison between K1 and J1, according to the present embodiment, the feeling of shock of deceleration when the acceleration pedal 18 is set to the non-operation state during the high-velocity travel can be reduced. In addition, even when the vehicle velocity is rapidly reduced in an a region of FIG. 8 where the velocity is sufficiently reduced, because the absolute value of the vehicle velocity itself is sufficiently small, the feeling of shock is also sufficiently small.

The controller 60 also changes the displacement of the hydraulic motor 36 to the maximum displacement at the same time when the displacement of the hydraulic pump 34 reaches the stand-by displacement when the position of the acceleration pedal 18 represented by the detection signal which is input from the pedal sensor 66 is set at the non-operation state. Because of this, rapid deceleration of the vehicle can be sufficiently reduced even in a state immediately before stopping of the vehicle.

The controller 60 also reduces the degree of increase of the displacement of the hydraulic motor 36 corresponding to the reduction of the displacement of the hydraulic pump 34 in the initial stage of deceleration compared to the normal time when the position of the brake pedal 20 represented by the detection signal which is input from the second pedal sensor 68 is set to the operation position after the position of the acceleration pedal 18 represented by the detection signal which is input from the pedal sensor 66 is switched from the operation position to the non-operation position, or the aggressive deceleration mode is set by the sensitivity adjustment dial 76. Because of this, the degree of deceleration of the vehicle can be increased in the initial stage of deceleration compared to the normal time based on an operation of the driver, to stop the vehicle with a shorter distance.

K2 and K3 of FIG. 8 show cases where the vehicle is decelerated according to the aggressive deceleration modes. K2 corresponds to a case where the vehicle is decelerated along a curve b1 showing an aggressive deceleration mode from the point A of FIG. 5. K3 corresponds to a case where the brake pedal 20 is operated at a time where, after the acceleration pedal 18 is set to the non-operation state, the velocity reaches a certain velocity V2. As is clear from comparison of J1, K1, and K2 in FIG. 8, in the present embodiment, the feeling of shock during deceleration can be reduced compared to the case of the comparative example where the displacement of the hydraulic motor 36 is maintained at the constant during deceleration, and the vehicle can be stopped in a shorter distance compared to the standard deceleration mode which is the normal time. In this case, the feeling of shock at the initial stage of deceleration is larger than the case following the standard deceleration mode, but the driver's desire to stop rapidly in order to avoid an obstacle or the like can be more quickly satisfied. In this case, the hydraulic braking function of the HST 26 can be effectively used. In addition, the degree of deceleration can be set by the sensitivity adjustment dial 76, and the feeling of shock during deceleration can be adjusted by the user.

In FIG. 4, when the standard deceleration mode is set to a1 as the line segment which connects the point A and the point B, a relationship shown by a straight line shape a0 may be used as the aggressive deceleration mode. When b1 is set as the aggressive deceleration mode, the relationship shown by the straight line shape a0 may be used as the standard deceleration mode. When the aggressive deceleration mode is set by the sensitivity adjustment dial 76, the deceleration control may be applied according to the aggressive deceleration mode which is set by the sensitivity adjustment dial 76 not from the time of non-operation of the acceleration pedal 18, but rather from the time of operation of the brake pedal 20. In addition, the deceleration intensity at the initial stage of deceleration can also be adjusted continuously by the sensitivity adjustment dial 76. For example, a mode for an intermediate position in FIG. 5 not defined by modes b41, b42, . . . may be set by interpolation from the defined modes b41, b42, . . . on both sides or using a preset relationship equation.

Alternatively, the sensitivity adjustment dial 76 described above may be omitted. In this case, the deceleration control is applied by the aggressive deceleration modes b1, b2, . . . in FIG. 4 by the operation of the brake pedal 20. Alternatively, the travel control unit 69 may have a mode selection switch 78 which is a mode selection unit shown in FIG. 2, in place of the sensitivity adjustment dial 76. The mode selection switch 78 allows the user to select one of the standard deceleration mode and the aggressive deceleration mode. The "aggressive deceleration mode" is a mode in which the degree of increase of the displacement of the hydraulic motor 36 corresponding to the reduction of the displacement of the hydraulic pump 34 is reduced in the initial stage of deceleration compared to the "standard deceleration mode", and is shown, for example, with b1, b2, . . . b6 of FIG. 4. The controller 60 changes the displacement of the hydraulic motor 36 corresponding to the displacement of the hydraulic pump 34 based on a mode according to the selection at the mode selection switch 78. The other structures are similar to the embodiment described above. When the mode selection switch 78 is used in this manner also, an advantage similar to that in the case where the aggressive deceleration mode is set by the sensitivity adjustment dial 76 can be obtained. Alternatively, a mode selection button or a liquid crystal display unit may be used as the mode selection unit in place of the mode selection switch 78, to allow the user to select one of the standard deceleration mode and the aggressive deceleration mode.

In the above description, the use of the acceleration pedal 18 as the acceleration operator has been described, but alternatively, a transmission lever may be provided at a peripheral section of the driver seat as the acceleration operator. For example, the transmission lever may be configured to be able to be reciprocated in the front-and-rear direction, increase in the forward movement velocity may be instructed by tilting the transmission lever to the front, and increase in the backward movement velocity may be instructed by tilting the transmission lever to the rear. In this case, an upright position of the transmission lever corresponds to the neutral position and instructs that the velocity should be 0. In the case where such a transmission lever is used also, a structure may be employed in which the controller 60 increases the displacement of the hydraulic motor 36 as the displacement of the hydraulic pump 34 is reduced by the transmission lever approaching 0, that is, displacing in the low-velocity side, during the high-velocity traveling. In this configuration also, an advantage similar to the above-described embodiment can be obtained.

In the above-described embodiment, a case where the aggressive deceleration mode is set has been described, but alternatively, a configuration may be employed in which the aggressive deceleration mode is not set regardless of the operation of the brake pedal 20.

[Second Preferred Embodiment]

Figure 9:
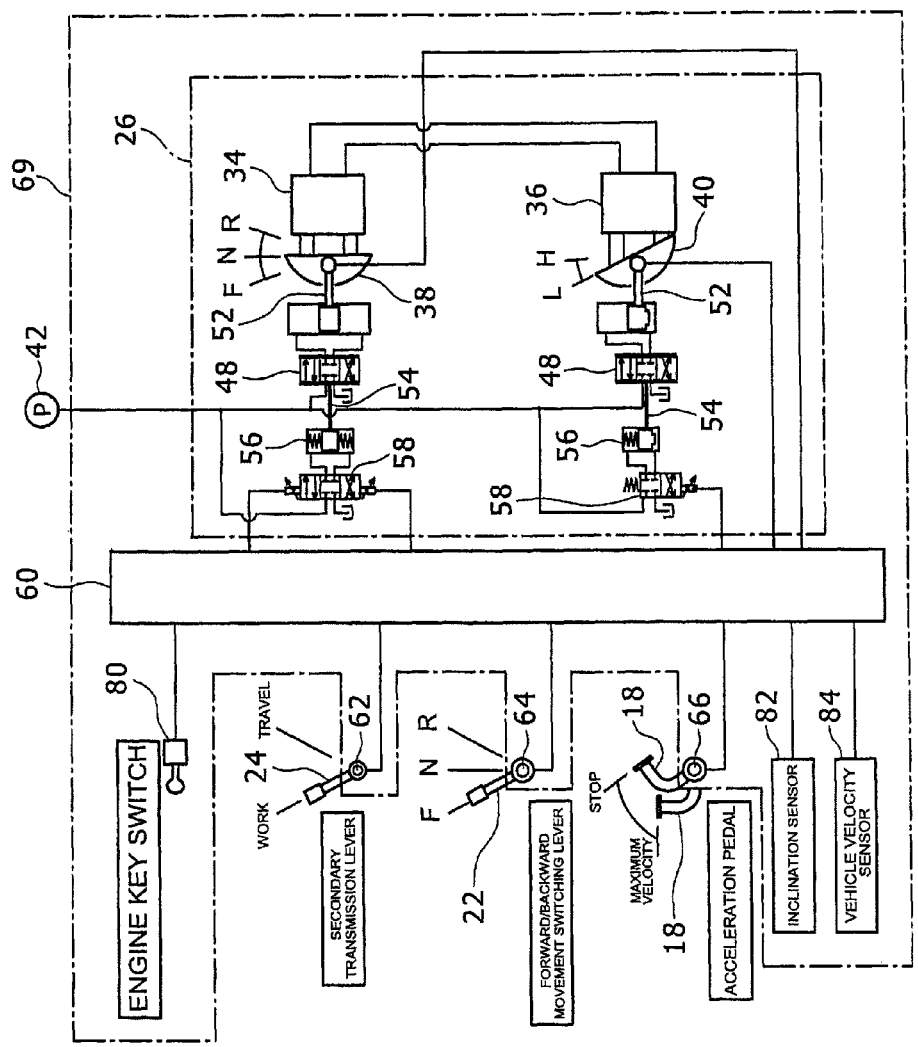
FIG. 9 is a diagram showing a hydraulic control circuit and a controller of a hydraulic continuously variable transmission controlled by a travel control unit according to a second preferred embodiment of the present invention.

FIGS. 9 and 10 are diagrams showing a second preferred embodiment according to the present invention. An overall structure of a working vehicle equipped with a travel control unit of a working vehicle according to the present embodiment is similar to the structure shown in FIG. 1.

FIG. 9 is a diagram showing a hydraulic control circuit and a controller of a continuously variable transmission controlled by the travel control unit of the present embodiment. Similar to the structure of FIG. 1, the working vehicle 10 comprises a vehicle frame, an engine 12, front wheels (not shown), left and right rear wheels 13, a working implement, and a motive power transmitting apparatus 16. An acceleration pedal 18 (FIG. 9) and a brake pedal (not shown) which is a brake operator are provided on a front side of a driver seat.

As shown in FIG. 9, similar to the structure of FIG. 2, in a casing of the HST 26, two hydraulic servo mechanisms 48 respectively corresponding to the hydraulic pump 34 and the hydraulic motor 36 are provided. Directions and amounts of inclination of movable swash plates 38 and 40 are determined according to a control signal which is input from the controller 60 to directional control valves.

The controller 60 comprises a microcomputer having a CPU and a storage unit such as a memory. Detection signals are input to the controller 60 from a plurality of operator sensors. Specifically, a position of the secondary transmission lever 24 is detected by a lever sensor 62 which is an operator sensor. A position of the forward/backward movement switching lever 22 is detected by a second lever sensor 64 which is an operator sensor. A position of the acceleration pedal 18 is detected by a pedal sensor 66 which is an operator sensor. When the acceleration pedal 18 is depressed, the pedal sensor 66 provided at a peripheral section of the acceleration pedal 18 detects an amount of depression, that is, an amount of operation, of the acceleration pedal 18.

An operation position of the brake pedal (not shown) is detected by another pedal sensor (not shown). Detection signals of the sensors 62, 64, and 66 are input to the controller 60. The travel control unit 69 of the present embodiment comprises the HST 26, the controller 60, and the sensors 62, 64, and 66 described above. The travel control unit 69 also comprises an engine key switch 80 which is a main switch, an inclination sensor 82, and a vehicle velocity sensor 84 which is a vehicle velocity detecting unit. The engine key switch 80 is for starting the engine by being rotated in a state where a key is inserted. When the engine key switch 80 is switched ON, the controller 60 outputs a startup signal to a starting motor of the engine 12 in a state where electricity is applied from a battery (not shown) to the controller 60.

The inclination sensor 82 detects, based on a current inclination angle of the vehicle with respect to a horizontal plane, an inclination angle of the ground on which the vehicle is positioned, and outputs a detection signal to the controller 60. In addition, when the controller 60 judges that a working mode is instructed based on the detection signal of the lever sensor 62, the controller 60 connects a clutch provided between the engine 12 and the working implement (not shown), and drives the working implement. In this case, the controller 60 can control a lifting apparatus (not shown) to lower the working implement so that the working implement is in contact with the ground. The vehicle velocity sensor 84 detects the vehicle velocity of the vehicle, and outputs a detection signal to the controller 60.

With reference to FIG. 3, the controller 60 comprises a hydraulic pump displacement control unit 70, a hydraulic motor displacement control unit 72, and a storage unit 74. A program for executing control to be described later can be stored in advance in the storage unit 74.

The hydraulic motor displacement control unit 72 (FIG. 3) switches the displacement control of the hydraulic motor 36 during starting of the travel of the vehicle to execute work travel in which the working implement is driven, or to execute non-work, normal travel in which the working implement is not driven. FIG. 10 is a diagram showing the capacities of the hydraulic pump and the hydraulic motor when starting to travel, in comparison of the cases of the work travel and the normal travel. In the following description, elements identical to those shown in FIGS. 1 and 9 are assigned the same reference numerals for the description. In FIG. 10, the "normal travel" is shown in a divided manner between (less than a predetermined inclination) and (greater than or equal to the predetermined inclination), because separate controls are applied according to the inclination angle of the ground on which the vehicle is positioned. During the work travel, the displacement of the hydraulic motor 36 when starting to travel is maintained at the maximum displacement of the variable displacement range, that is, fixed at the maximum. During the start of travel of the vehicle in normal travel with the ground at an angle less than the predetermined inclination, the displacement of the hydraulic motor 36 is set at the maximum, and is changed toward the minimum displacement with the acceleration of the vehicle. During the start of normal travel with the ground at an angle greater than or equal to the predetermined inclination, the displacement of the hydraulic motor 36 is maintained at the maximum, that is, fixed at the maximum, or is changed toward the minimum displacement with the acceleration of the vehicle.

In both cases of the work travel and the normal travel in FIG. 10, the hydraulic pump displacement control unit 70 sets the displacement of the hydraulic pump 34 at the minimum during the start of travel and changes the displacement toward the maximum displacement with the acceleration of the vehicle.

The inclination angle of the movable swash plate 40 of the hydraulic motor 36, that is, an inclination angle with respect to a plane perpendicular to a shaft direction of the motor shaft 44 (FIG. 1) can be continuously changed between an L position and an H position of FIG. 9. When the inclination angle of the movable swash plate 40 of the hydraulic motor 36 is at the maximum and at the L position, the hydraulic motor 36 has the maximum displacement. In this case, the movable swash plate of the hydraulic motor 36 is said to be at a "full swash plate position". That is, an amount of hydraulic oil compressed by a piston in a cylinder of the hydraulic motor 36 during one rotation of the motor shaft 44 and discharged is at the maximum.

On the other hand, when the inclination angle of the movable swash plate 40 of the hydraulic motor 36 is at the minimum and at the H position, the hydraulic motor 36 has the minimum displacement. That is, an amount of hydraulic oil compressed by the piston in the cylinder of the hydraulic motor 36 during one rotation of the motor shaft 44 and discharged is at the minimum. As described, the hydraulic motor 36 has a structure in which the displacement can be continuously changed between the minimum displacement and the maximum displacement.

In order to control the capacities of the hydraulic pump 34 and the hydraulic motor 36 in this manner, the hydraulic motor displacement control unit 72 judges whether or not the working implement is being driven based on a signal which is input from the secondary transmission lever 24. The hydraulic motor displacement control unit 72 also judges whether or not the inclination angle with respect to the horizontal plane of the ground on which the vehicle is positioned is greater than or equal to the predetermined inclination angle based on a signal which is input from the inclination sensor 82. The hydraulic motor displacement control unit 72 further judges whether or not the acceleration pedal 18 is in the non-operation state, that is, in the "stop" position of FIG. 9 based on a signal which is input from the pedal sensor 66, and detects whether or not the vehicle velocity is 0 based on a signal which is input from the vehicle velocity sensor 84. When the hydraulic motor displacement control unit 72 judges that the vehicle velocity is 0, the acceleration pedal 18 is in the non-operation state, and the working implement is being driven as a result of these judgments, the hydraulic motor displacement control unit 72 fixes the displacement of the hydraulic motor 36 at the maximum, as shown in a column of work travel in FIG. 10. Because of this, when the acceleration pedal 18 is operated and the vehicle starts to travel, the displacement of the hydraulic motor 36 is maintained at the maximum (displacement corresponding to the L position of FIG. 9) regardless of the acceleration.

When the hydraulic motor displacement control unit 72 judges that the vehicle velocity is 0, the acceleration pedal 18 is in the non-operation state, the working implement is not being driven, and the inclination angle of the ground is less than the predetermined value, the hydraulic motor displacement control unit 72 sets the displacement of the hydraulic motor 36 at the maximum, and changes the displacement of the hydraulic motor 36 toward the minimum displacement with the increase of the amount of operation, that is, amount of depression of the acceleration pedal 18, as shown in a column of normal travel (less than predetermined inclination) of FIG. 10. In other words, when the acceleration pedal 18 is operated from the "stop" position to the "maximum velocity" position of FIG. 9 and the vehicle starts to travel, the displacement of the hydraulic motor 36 is changed from the maximum (displacement corresponding to the L position of FIG. 9) toward the minimum (displacement corresponding to the H position in FIG. 9).

When the hydraulic motor displacement control unit 72 judges that the vehicle velocity is 0, the acceleration pedal 18 is in the non-operation state, the working implement is not being driven, and the inclination angle of the ground is greater than or equal to the predetermined value, the hydraulic motor displacement control unit 72 fixes the displacement of the hydraulic motor 36 at the maximum as shown in a column of normal travel (greater than or equal to predetermined inclination) of FIG. 10. Because of this, when the acceleration pedal 18 is operated and the vehicle starts to travel, the displacement of the hydraulic motor 36 is maintained at the maximum (displacement corresponding to the L position of FIG. 9) regardless of the acceleration. Alternatively, in this case, the hydraulic motor displacement control unit 72 may set the displacement of the hydraulic motor 36 at the maximum and change the displacement of the hydraulic motor 36 toward an intermediate displacement which is a predetermined minimum allowable displacement as the amount of operation of the acceleration pedal 18 is increased. The "intermediate displacement" is set to be larger than a "normal minimum allowable displacement" of the hydraulic motor 36 which is set when the inclination angle of the ground is 0. In this case, the value of the intermediate displacement may be set to a certain value in advance or according to the inclination angle of the ground such that the intermediate displacement is increased as the inclination angle of the ground is increased. Such a displacement control of the hydraulic motor 36 during the start of travel can be executed only during the initial stage of starting to travel, for example, when the amount of operation of the acceleration pedal 18 is less than or equal to a predetermined amount which is set in advance, and at later stages, the control may be changed such that the displacement of the hydraulic motor 36 being reduced as the amount of operation of the acceleration pedal 18 is increased.

In this manner, the hydraulic motor displacement control unit 72 always sets the displacement of the hydraulic motor 36 at the initial stage of starting to travel to the maximum displacement in the variable displacement range, regardless of the drive state of the working implement and the inclination angle of the ground. Because of this, even when the hydraulic motor displacement control unit 72 judges that the working implement is not being driven based on the input signal from the lever sensor 62 and that the normal travel has started, the displacement of the hydraulic motor 36 at the initial stage of the starting to travel is always set at the maximum displacement. In addition, when it is judged that the working implement is not being driven and the acceleration pedal 18 is operated to the acceleration state, the controller 60 changes the displacement of the hydraulic pump 34 to the "maximum displacement side" and the displacement of the hydraulic motor 36 to the "minimum displacement side" in the state where the inclination of the ground is "less than predetermined inclination". Moreover, the hydraulic motor displacement control unit 72 applies control to set the displacement of the hydraulic motor 36 to the maximum displacement at both the time of stopping and the time of starting of the engine 12 by the engine key switch 80.

According to the travel control unit 69 of working vehicle having such a configuration, a travel starting performance of the working vehicle 10 according to the desires of the user can be more easily provided. Specifically, as described above, when the travel control unit 69 is equipped on the working vehicle 10, the displacement of the hydraulic motor 36 at the initial stage of starting to travel is always set at the maximum displacement regardless of the working state of the working implement or the like. In this case, even when the amount of discharge of the hydraulic pump 34 is increased based on the operation of the acceleration pedal 18, the rate of increase of the rotational velocity of the motor shaft 44 of the hydraulic motor 36 can be kept low, and thus a smooth travel starting performance can be realized even when the operation of the acceleration pedal 18 is rapid. Because of this, when the user desires a travel starting performance which is always smooth, a performance corresponding to the desire can be provided.

For example, when the working vehicle 10 is a farm tractor and the vehicle rapidly starts to travel in the work state, the ground may be set to an unfavorable state such as a rough field. In the present embodiment, even when the operation of the acceleration pedal 18 is rapid during the work, the acceleration at the starting of travel of the vehicle is low, which enables prevention of the unfavorable state of the ground. In addition, the feeling of rapid acceleration by the driver during the travel starting can be inhibited, and a driver-friendly and ground-friendly acceleration can be realized.

On the other hand, when it is judged that the inclination angle of the ground is less than the predetermined angle in the normal travel in which the working implement is not driven and the acceleration pedal 18 is operated in the acceleration state, the controller 60 changes the displacement of the hydraulic pump 34 to the maximum displacement side and the displacement of the hydraulic motor 36 to the minimum displacement side. Because of this, the degree by which the velocity of the vehicle is increased according to the operation of the acceleration pedal 18 during the normal travel is higher than that in the work travel.

The controller 60 also sets the displacement of the hydraulic motor 36 at the maximum in the initial state of starting to travel even when the inclination angle of the ground is greater than or equal to the predetermined angle in the normal travel. Because of this, even when the vehicle starts to travel on an uphill road, the torques of the front wheels and the rear wheels 14 can be set high. Therefore, an instantaneous slipping and falling in the case when the brake pedal is released and then the acceleration pedal 18 is depressed can be effectively prevented, and more stable maneuvering is enabled. In addition, even when the vehicle starts to travel on a downhill road, the resistance with respect to unintended slipping and falling can be set high, which also enables more stable maneuvering.

The hydraulic motor displacement control unit 72 also limits, according to the inclination angle of the ground, the intermediate displacement which is the minimum allowable displacement of the hydraulic motor 36 to be higher than the normal minimum allowable displacement which is set when the inclination angle of the ground is 0. Because of this, the maximum velocity of the vehicle in the case where the inclination of the ground is high can be lowered, and stable maneuvering can be enabled on hilly roads.

[Third Preferred Embodiment]

FIG. 11 is a diagram showing capacities of the hydraulic pump and the hydraulic motor during start of travel in a third preferred embodiment of the present invention, in a comparison of the work travel and the normal travel. Basic structures of a travel control unit and a working vehicle equipped with the travel control unit of the present embodiment are similar to those in the second preferred embodiment described above. Thus, same or equivalent elements as the elements shown in FIGS. 1, 3, and 9 are assigned the same reference numerals, and portions that differ from the second preferred embodiment will primarily be described. In the second preferred embodiment, the displacement of the hydraulic motor 36 at the initial stage of starting to travel is always set at the maximum displacement. On the contrary, in the present embodiment, the displacement of the hydraulic motor 36 at the initial stage of starting to travel is set differently between the work travel and the normal travel with the inclination angle of the ground being less than the predetermined angle. Specifically, when a hydraulic motor displacement control unit 72 (refer to FIG. 3) provided in the controller 60 judges that the vehicle is in the work state in which the working implement is being driven based on the input signal, the hydraulic motor displacement control unit 72 sets the displacement of the hydraulic motor 36 at the initial stage of starting to travel to the maximum displacement in the variable displacement range. In addition, in the same case, when the hydraulic motor displacement control unit 72 judges that the vehicle is in the non-work state in which the working implement is not being driven based on the input signal, and a "special condition" which is set in advance is satisfied, the hydraulic motor displacement control unit 72 sets the displacement of the hydraulic motor 36 at the initial stage of starting to travel to the minimum displacement in the variable displacement range. In the present embodiment, the "special condition" is a condition where the inclination angle of the ground on which the vehicle is positioned is less than a predetermined angle. Because of this, at the initial stage of starting to travel in the normal travel which is a non-work state, and with the inclination angle of the ground being less than the predetermined angle, the displacement of the hydraulic motor 36 is set to the minimum (displacement corresponding to the H position of FIG. 9). In addition, in this normal travel, even when the amount of operation of the acceleration pedal 18 is increased during the start of travel, the displacement of the hydraulic motor 36 is maintained and fixed at the minimum displacement.

When the hydraulic motor displacement control unit 72 judges that the vehicle velocity is 0, the acceleration pedal 18 is in the non-operation state, and the working implement is being driven, similar to the first preferred embodiment described above, the hydraulic motor displacement control unit 72 fixes the displacement of the hydraulic motor 36 at the maximum (displacement corresponding to the L position in FIG. 9), as shown in the column of work travel in FIG. 11.

When the hydraulic motor displacement control unit 72 judges that the vehicle velocity is 0, the acceleration pedal 18 is in the non-operation state, the working implement is not being driven, and the inclination angle of the ground is greater than or equal to the predetermined value, the hydraulic motor displacement control unit 72 fixes the displacement of the hydraulic motor 36 at the maximum (displacement corresponding to the L position of FIG. 9) according to a relationship of the normal travel (greater than or equal to predetermined inclination) shown in FIG. 11. Alternatively, in place of this process, in the same case, the hydraulic motor displacement control unit 72 may change the displacement of the hydraulic motor 36 from the maximum displacement to an intermediate displacement which is a predetermined minimum allowable displacement as the amount of operation of the acceleration pedal 18 is increased. Alternatively, in the same case, the hydraulic motor displacement control unit 72 may fix the displacement of the hydraulic motor 36 to an "inclination angle-corresponding displacement" which is set in advance corresponding to the inclination angle of the ground, or change the displacement of the hydraulic motor 36 to be reduced from the "inclination angle-corresponding displacement" toward the intermediate displacement described above. The "inclination angle-corresponding displacement" may be set, for example, to become larger as the inclination angle of the ground becomes larger.

The hydraulic motor displacement control unit 72 applies a control to set the displacement of the hydraulic motor 36 at the maximum displacement in both the stopping and starting of the engine 12 by the engine key switch 80. Because of this, when the vehicle starts to travel in the normal travel with the inclination angle of the ground being less than the predetermined angle, the vehicle starts to travel by first changing the displacement of the hydraulic motor 36 to the minimum when the acceleration pedal 18 is operated, and then, increasing the displacement of the hydraulic pump 34.

In the case of the present embodiment having such a configuration also, a travel starting performance of the working vehicle 10 according to the user's desires can be more easily provided. In the present embodiment, even when the operation of the acceleration pedal 18 is rapid during the time when the working implement is being driven, a smooth travel starting performance can be obtained, and in the case when the working implement is not being driven, the degree of increase of the vehicle velocity with respect to the operation of the acceleration pedal 18 can be increased so that a quick travel starting performance can be obtained. Therefore, when the user desires a smooth travel starting performance in the work state and a quick travel starting performance in the non-work state, a performance according to the desire can be provided. Other structures and operations are similar to those in the second preferred embodiment described above.

Figure 12:
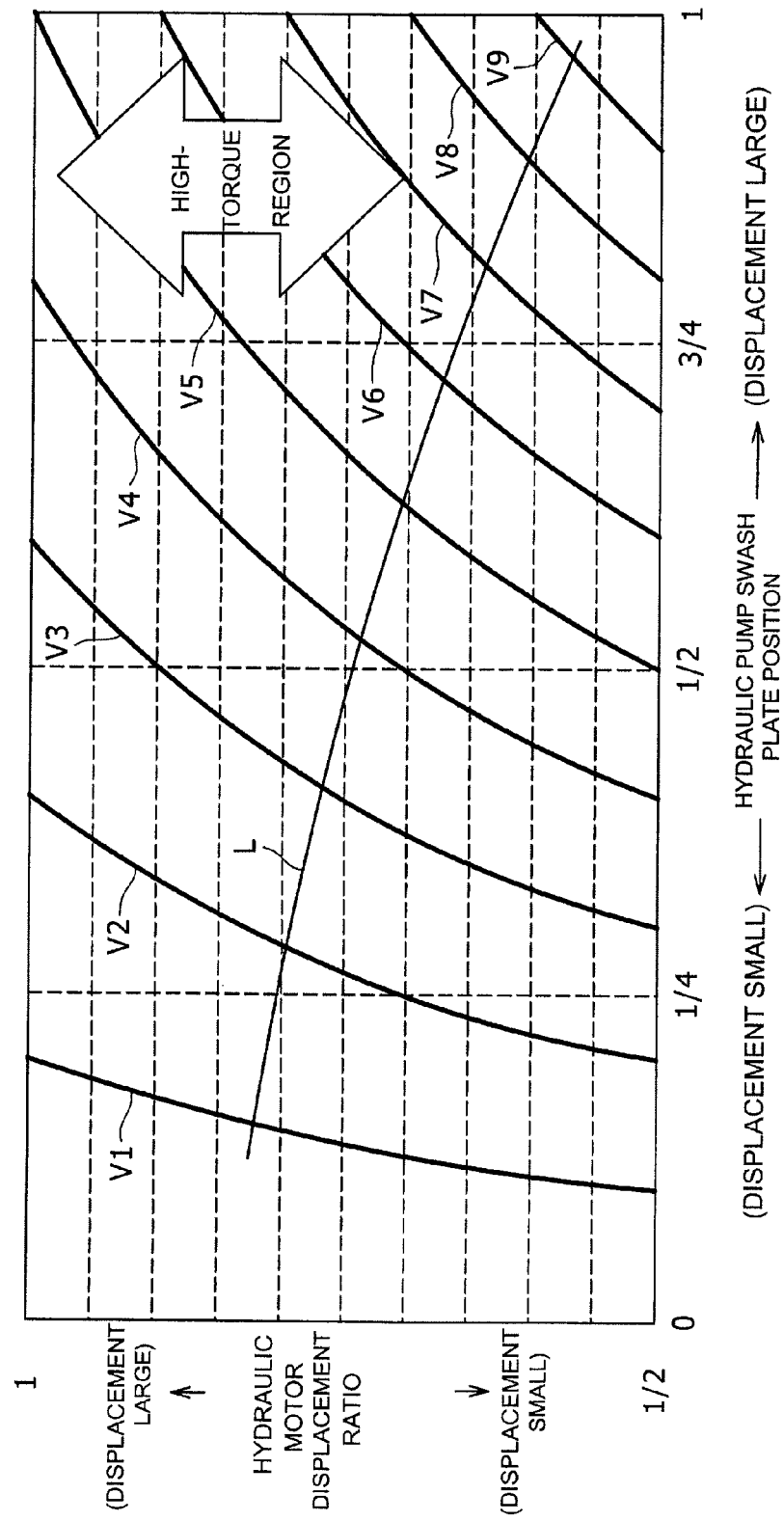
FIG. 12 is a diagram showing an efficiency map defined by one load condition in another configuration of the third preferred embodiment of the present invention.

FIG. 12 is a diagram showing an efficiency map defined under one load condition in an alternative configuration of the third preferred embodiment of the present invention. In the alternative configuration of the third preferred embodiment, the controller 60 stores in the storage unit 74 (refer to FIG. 3) in advance, for each of a plurality of load values, an efficiency map defining a highest efficiency point of the engine corresponding to the load value (for example, an engine load value), capacities of the hydraulic pump 34 and the hydraulic motor 36, and the vehicle velocity. FIG. 12 shows an efficiency map under one load condition, and data of a plurality of efficiency maps are stored in the storage unit 74 corresponding to a plurality of different load values. In the stages other than the initial stage of starting to travel, the controller 60 obtains, that is, calculates, the capacities of the hydraulic pump 34 and the hydraulic motor 36 at the highest efficiency point where the highest efficiency of the engine 12 can be obtained, based on the load value obtained from the signal which is input from the engine rotational number detecting unit or the like (not shown), the vehicle velocity detected by the vehicle velocity sensor 84, and the corresponding efficiency map stored in the storage unit 74. The controller 60 controls the hydraulic pump 34 and the hydraulic motor 36 to realize the capacities thus obtained. For example, the case after the amount of operation, that is, amount of depression, of the acceleration pedal 18 has reached a value greater than or equal to a predetermined amount which is set in advance may be set as "stages other than the initial stage of starting to travel" described above.

A horizontal axis of FIG. 12 represents the swash plate position of the hydraulic pump 34, and shows that the hydraulic pump 34 has the maximum displacement at the swash plate position 1, that the displacement is gradually reduced in the order of 3/4, 1/2, and 1/4, and that the stand-by position is reached at the swash plate position 0. The stand-by position represents a state where the movable swash plate 38 is positioned on a plane perpendicular to the rotational shaft of the hydraulic pump 34. In other words, the horizontal axis of FIG. 12 can be replaced by the displacement of the hydraulic pump 34.

A vertical axis of FIG. 12 represents a displacement ratio of the hydraulic motor 36, that is, a proportion of displacement with respect to the maximum displacement, with the case where the hydraulic motor 36 has the maximum displacement being set as 1. Therefore, the displacement ratio of 1/2 means that the hydraulic motor 36 has the minimum displacement having a displacement of 1/2 the maximum displacement. FIG. 12 shows that a region where the displacement ratio of the hydraulic motor is high is a high-torque region.

In FIG. 12, equi-velocity lines V1, V2, . . . are set. The equi-velocity lines V1, V2, . . . are set connecting points where the vehicle velocity is equal. A highest efficiency line L is also set connecting the highest efficiency points of the engine 12 under one load condition. The highest efficiency line L shown in FIG. 12 is merely an example, and the highest efficiency line L is not limited to the one exemplified in FIG. 12. The controller 60 obtains the capacities of the hydraulic pump 34 and the hydraulic motor 36 at the highest efficiency point of the engine 12 corresponding to the vehicle velocity obtained by the vehicle velocity sensor 84 on the efficiency map corresponding to the obtained load value, and controls the hydraulic pump 34 and the hydraulic motor 36 to realize the respective capacities. According to this configuration, energy can be saved in the working vehicle 10 equipped with the travel control unit 69. Other structures and operations are similar to those of the third preferred embodiment described above. Alternatively, such a configuration may be employed in combination with the second preferred embodiment described above.

Moreover, in the second and third preferred embodiments described above, a configuration is exemplified in which the acceleration pedal 18 is used as the acceleration operator, but alternatively, a transmission lever may be provided at a peripheral section of the driver's seat as the acceleration operator. For example, the transmission lever may be set to be able to be reciprocated in the front-and-rear direction, an increase of the forward movement velocity can be instructed by tilting the transmission lever to the front, and the increase in the backward movement velocity can be instructed by tilting the transmission lever to the rear. In this case, the upright position of the transmission lever is the neutral position and instructs a velocity of 0. Even when such a transmission lever is used, the controller 60 can control the displacement of the hydraulic motor 36 at the initial stage of starting to travel in the forward direction or the backward direction, so that advantages similar to those of the second and third preferred embodiments described above can be obtained.

Alternatively, the inclination sensor 82 may be omitted in the second preferred embodiment, the third preferred embodiment, or the alternative configuration of the third preferred embodiment as described above, to not apply the control according to the inclination angle of the ground on which the vehicle is positioned.

At least one of the travel control units of a working vehicle of the above-described preferred embodiments has a structure of the first aspect of travel control unit of the working vehicle described above. Because of this, even when the acceleration operator is displaced on the low-velocity side by a non-operation or the like during travel of the vehicle, the displacement of the hydraulic motor is increased as the displacement of the hydraulic pump is reduced. Therefore, a rapid deceleration of the hydraulic motor can be reduced, and the rapid deceleration of the vehicle when the acceleration operator is displaced to the low-velocity side can be reduced.

At least one of the travel control units of a working vehicle of the above-described preferred embodiments has a structure of the second or third aspect of travel control unit of the working vehicle. Because of this, a travel starting performance of the working vehicle corresponding to the desires of the user can be more easily provided. For example, according to the second aspect of travel control unit of the working vehicle, when the travel control unit is equipped on a working vehicle, because the displacement of the hydraulic motor at the initial stage of starting to travel is always set at the maximum displacement regardless of the working state of the working implement or the like, a smooth travel starting performance can be obtained even when the operation of the acceleration operation is rapid. Therefore, when the user desires a constant smooth travel starting performance, a performance according to this desire can be provided. According to the third aspect of travel control unit of the working vehicle, when the working implement is driven, even if the operation of the acceleration operator is rapid, a smooth travel starting performance can be obtained, and when the working implement is not driven, the degree of increase of the vehicle velocity with respect to the operation of the acceleration operator can be increased and a quick travel starting performance can be obtained. Therefore, when the user desires a smooth travel starting performance in the work state and a quick travel starting performance in the non-work state, a performance corresponding to the desire can be provided.

What is claimed is:

1. A travel control unit of a working vehicle, comprising:
a hydraulic continuously variable transmission which is interposed between an engine and a wheel, which includes a hydraulic pump driven by the engine and a hydraulic motor fluidly connected to the hydraulic pump, and wherein the hydraulic pump and the hydraulic motor are respectively of a continuous displacement variable type in which a displacement continuously varies;
a pedal sensor which detects a position of an acceleration pedal; and
a controller which changes the displacement of the hydraulic pump according to the position of the acceleration pedal during deceleration of the working vehicle, wherein
the controller increases the displacement of the hydraulic motor as the displacement of the hydraulic pump is reduced due to a displacement of the acceleration pedal to a low-velocity side during deceleration of the working vehicle, and, when starting reduction of the displacement of the hydraulic pump, starts increase of the displacement of the hydraulic motor.

2. The travel control unit of working vehicle according to claim 1, wherein
the controller changes the displacement of the hydraulic motor to a maximum displacement at the same time as the displacement of the hydraulic pump reaches a stand-by displacement when the position of the acceleration pedal is set at a non-operation position.

3. The travel control unit of working vehicle according to claim 1, wherein
a brake pedal sensor which detects a position of a brake pedal is further provided, and
the controller reduces a degree of increase of the displacement of the hydraulic motor corresponding to a reduction of the displacement of the hydraulic pump in an initial stage of deceleration compared to a time when the position of the acceleration pedal is at the non-operation position and the brake pedal is not operated, when the position of the acceleration pedal is set from an operation position to a non-operation position and then the position of the brake pedal is set at an operation position.

4. The travel control unit of working vehicle according to claim 1, further comprising:
a deceleration state setting unit which can set a relationship of the displacement of the hydraulic motor with respect to the displacement of the hydraulic pump continuously or in a plurality of stages, wherein
the controller changes the displacement of the hydraulic motor according to the displacement of the hydraulic pump based on a setting at the deceleration state setting unit.

5. The travel control unit of working vehicle according to claim 1, further comprising:
a mode selection unit which can select a standard deceleration mode and an aggressive deceleration mode in which a degree of increase of the displacement of the hydraulic motor corresponding to a reduction of the displacement of the hydraulic pump is reduced at an initial stage of deceleration compared to the standard deceleration mode, wherein
the controller changes the displacement of the hydraulic motor according to the displacement of the hydraulic pump in a mode corresponding to the selection at the mode selection unit.

6. The travel control unit of working vehicle according to claim 1, further comprising:
a vehicle velocity detecting unit which detects a vehicle velocity, wherein
the controller changes the displacement of the hydraulic pump according to the position of the acceleration pedal and always sets the displacement of the hydraulic motor at an initial stage of starting of travel to a maximum displacement in a variable displacement range, and further stores an efficiency map defining a highest efficiency point of the engine corresponding to a load value, the displacements of the hydraulic pump and the hydraulic motor, and a vehicle velocity, and controls the hydraulic pump and the hydraulic motor at stages other than an initial stage of starting to travel to realize the displacements of the hydraulic pump and the hydraulic motor at the highest efficiency point obtained based on the load value, the vehicle velocity detected by the vehicle velocity detecting unit, and the efficiency map.

7. The travel control unit of working vehicle according to claim 1, further comprising:
a vehicle velocity detecting unit which detects a vehicle velocity, wherein
the controller changes the displacement of the hydraulic pump according to the position of the acceleration pedal, and sets the displacement of the hydraulic motor at an initial stage of starting of travel to a maximum displacement in a variable displacement range when the controller judges that a working implement is being driven, and sets the displacement of the hydraulic motor at the initial stage of starting to travel to a minimum displacement in the variable displacement range when the controller judges that the working implement is not being driven and a special condition which is set in advance is satisfied, and further stores an efficiency map defining a highest efficiency point of the engine corresponding to a load value, the displacements of the hydraulic pump and the hydraulic motor, and a vehicle velocity, and controls the hydraulic pump and the hydraulic motor at stages other than an initial stage of starting to travel to realize the displacements of the hydraulic pump and the hydraulic motor at the highest efficiency point obtained based on the load value, the vehicle velocity detected by the vehicle velocity detecting unit, and the efficiency map.

* * * * *